(12) United States Patent
Gantenbrink

(10) Patent No.: US 7,527,162 B2
(45) Date of Patent: May 5, 2009

(54) METHOD FOR CLOSING A HOLLOW GLASS BODY, AND HOLLOW GLASS BODY

(76) Inventor: Rudolf Gantenbrink, Flemingstrasse 44, 81925 Muenchen (DE)

( * ) Notice: Subject to any disclaimer, the term of this patent is extended or adjusted under 35 U.S.C. 154(b) by 543 days.

(21) Appl. No.: 10/517,520

(22) PCT Filed: May 9, 2003

(86) PCT No.: PCT/EP03/04889

§ 371 (c)(1),
(2), (4) Date: Jun. 29, 2005

(87) PCT Pub. No.: WO03/106357

PCT Pub. Date: Dec. 24, 2003

(65) Prior Publication Data

US 2006/0054585 A1 Mar. 16, 2006

(30) Foreign Application Priority Data

Jun. 14, 2002 (DE) ................................ 102 26 591

(51) Int. Cl.
*B65D 39/00* (2006.01)
*B65D 39/04* (2006.01)

(52) U.S. Cl. .......................... 215/355; 215/232; 53/471

(58) Field of Classification Search ................. 215/355, 215/48, 49, 50, 263, 232; 53/471
See application file for complete search history.

(56) References Cited

U.S. PATENT DOCUMENTS

| 1,419,580 | A | * | 6/1922 | Molinari ...................... 141/381 |
| 2,009,738 | A | | 7/1935 | Kuenstler |
| 4,553,677 | A | * | 11/1985 | Shuster ......................... 215/50 |
| 4,926,915 | A | * | 5/1990 | Deussen et al. ............. 141/290 |
| 5,221,311 | A | * | 6/1993 | Rising et al. .................. 65/102 |
| 6,237,789 | B1 | * | 5/2001 | Zhu ............................. 215/48 |
| 6,613,406 | B1 | * | 9/2003 | Yaniger ..................... 428/34.4 |
| 2002/0050480 | A1 | * | 5/2002 | Rolle ........................... 215/49 |

FOREIGN PATENT DOCUMENTS

GB 221 107 9/1924

* cited by examiner

*Primary Examiner*—Anthony D Stashick
*Assistant Examiner*—Niki M Eloshway
(74) *Attorney, Agent, or Firm*—Oblon, Spivak, McClelland, Maier & Neustadt, P.C.

(57) ABSTRACT

The invention relates to a method for closing an already filled hollow glass body (1) comprising an essentially cylindrical filling vent (2), the filling opening being closed by fusion once the hollow body has been filled. Before the hollow body is filled, said filling vent is connected to the neck but can be opened at a later point. The aim of the invention is to reduce the remaining air volume in one such hollow body as much as possible. To this end, a glass above the filling level of the hollow body. Said vent plug is then fused, on its circumference with the free end of the cylindrical filling vent.

12 Claims, 4 Drawing Sheets

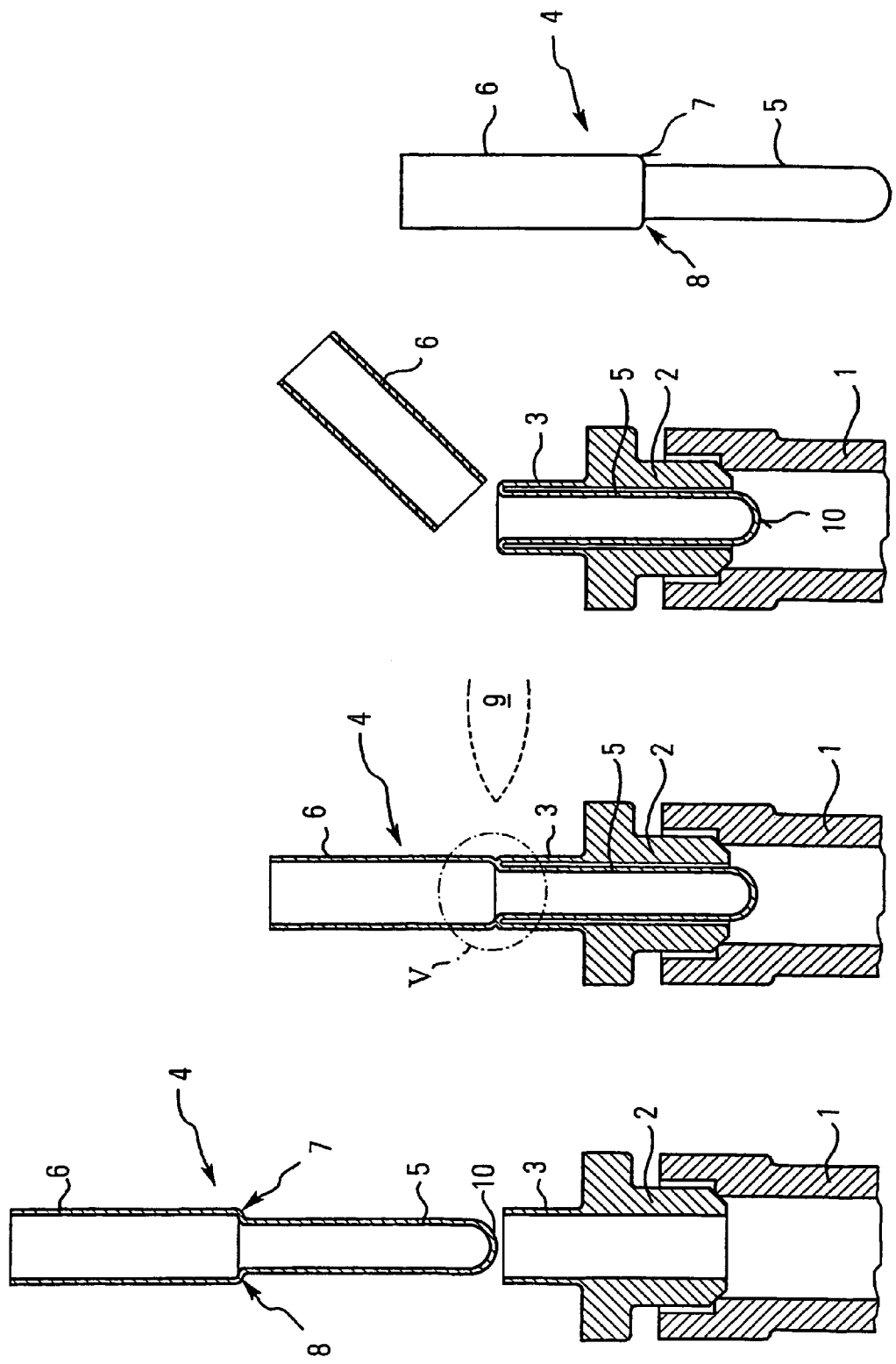

METHOD FOR CLOSING A HOLLOW GLASS BODY, AND HOLLOW GLASS BODY

The invention relates to a method for closing an already filled hollow glass body provided with an essentially cylindrical filling neck, said filling neck being closed by a melting process once the hollow body has been filled. The invention additionally relates to a fillable hollow glass body as well as to a kit which additionally comprises means for closing said hollow body. The post-published German patent application 10209990, which is owned by the present applicant, describes a wine bottle provided with a closing plug made of glass; the wine bottle can be opened later on by removing said closing plug. The closing plug itself is provided with an essentially cylindrical filling neck of thin-walled glass before wine is filled into the wine bottle. The wine is filled into the bottle through this filling neck. Subsequently, the thin-walled cylindrical filling neck is closed by a melting process. Just as in the case of an ampoule, the method described in DE 10209990 has the effect that an air gap remains above the product filled in. Depending on the product filled in, such an air gap may, however, be undesirable. In particular when high-quality wines are bottled, it is desirable to prevent the wine from reacting with air.

It is therefore the object of the present invention to provide a method and a hollow body of the type described at the beginning by means of which the smallest possible residual gas volume can be achieved above the bottled product.

According to the present invention, this object is achieved in that the filling neck has inserted therein a glass closing plug which drives out at least part of the air volume located above the filling level of the hollow body and which is then fused with the circumferentially extending free end of the cylindrical filling neck at the circumference thereof. This provides a plurality of advantages. Due to the fact that the closing plug projects into the filling neck, part of the air volume located above the filling level is driven out. The residual gas volume in the filled hollow body can be controlled optimally by the length and the diameter of the closing plug selected; these parameters can also be selected such that the closing plug extends up to and into the liquid bottled in the hollow body. In addition, the product contained in the hollow body will be heated to a lesser degree during closing of the bottle, since the air volume that could cause heating of the bottled product through convection during the melting process carried out for closing the hollow body is reduced in size. In view of the fact that the filling neck is reinforced by the closing plug inserted, the wall thickness of the glass can be reduced still further in the case of the filling neck as well as in the case of the closing plug, without the strength of the filling opening being impaired.

In this connection, it will be advantageous when the closing plug used is a thin-walled, hollow glass plug whose wall thickness is smaller than the wall thickness of the filling neck and corresponds preferably to approx. 50% of the wall thickness of said filling neck.

Preferably, a glass plug will be used whose free end is provided with a radially projecting flange having an outer diameter that corresponds approximately to the outer diameter of the filling neck, the outer diameter of the portion of the glass plug projecting into the filling neck corresponding approximately to the inner diameter of the filling neck. This has the effect that not only the residual gas volume in the hollow body but also the volume caused by the heating and the resultant vacuum are reduced as far as possible; heat transfer through convection during the melting process is excluded almost completely. What does still take place is practically only heat conduction through the thin-walled glass. In this way, it is possible to fill also thermally sensitive products into such hollow bodies and to seal said hollow body then hermetically.

According to a further development of the present invention, a lettering is applied to the outer surface of the portion of the closing plug projecting into the filling neck. This lettering can consist of an identification of the bottler or of other relevant data for the bottled product. After insertion of the closing plug, the lettering can be read through the glass wall of the filling neck or through the interior of the closing plug, but it is not accessible from outside and is therefore counterfeit-proof.

According to another preferred embodiment, the closing plug has, immediately below the flange, a constriction whose outer diameter is smaller than the outer diameter of the rest of the portion of the glass plug projecting into the filling neck. This constriction, which prevents the walls of the filling neck and of the closing plug as well as of the glass plug from fusing during the melting process, allows, however, an outer diameter of the glass plug portion projecting into the filling neck which is only slightly smaller than the inner diameter of the filling neck, whereby the heat transfer caused by the melting process can be reduced to a minimum. Due to the constriction, well-rounded transitions between the filling neck and the closing plug will be formed.

It will also be advantageous to provide the flange with a circumferentially extending centering bevel at least on the side facing the filling neck.

According to one variant, the closing plug can be implemented as a stepped component in which the flange is followed by a portion located outside the filling neck. This portion can be used for handling the closing plug during insertion of said closing plug into the filling neck. When the hollow body has been closed, the external portion is simply broken off.

In the following, the invention will be explained exemplarily.

FIG. 1-3 show individual method steps carried out for closing a hollow glass body;

FIG. 4 shows the closing plug used in accordance with the above-described figures;

Figure 5:
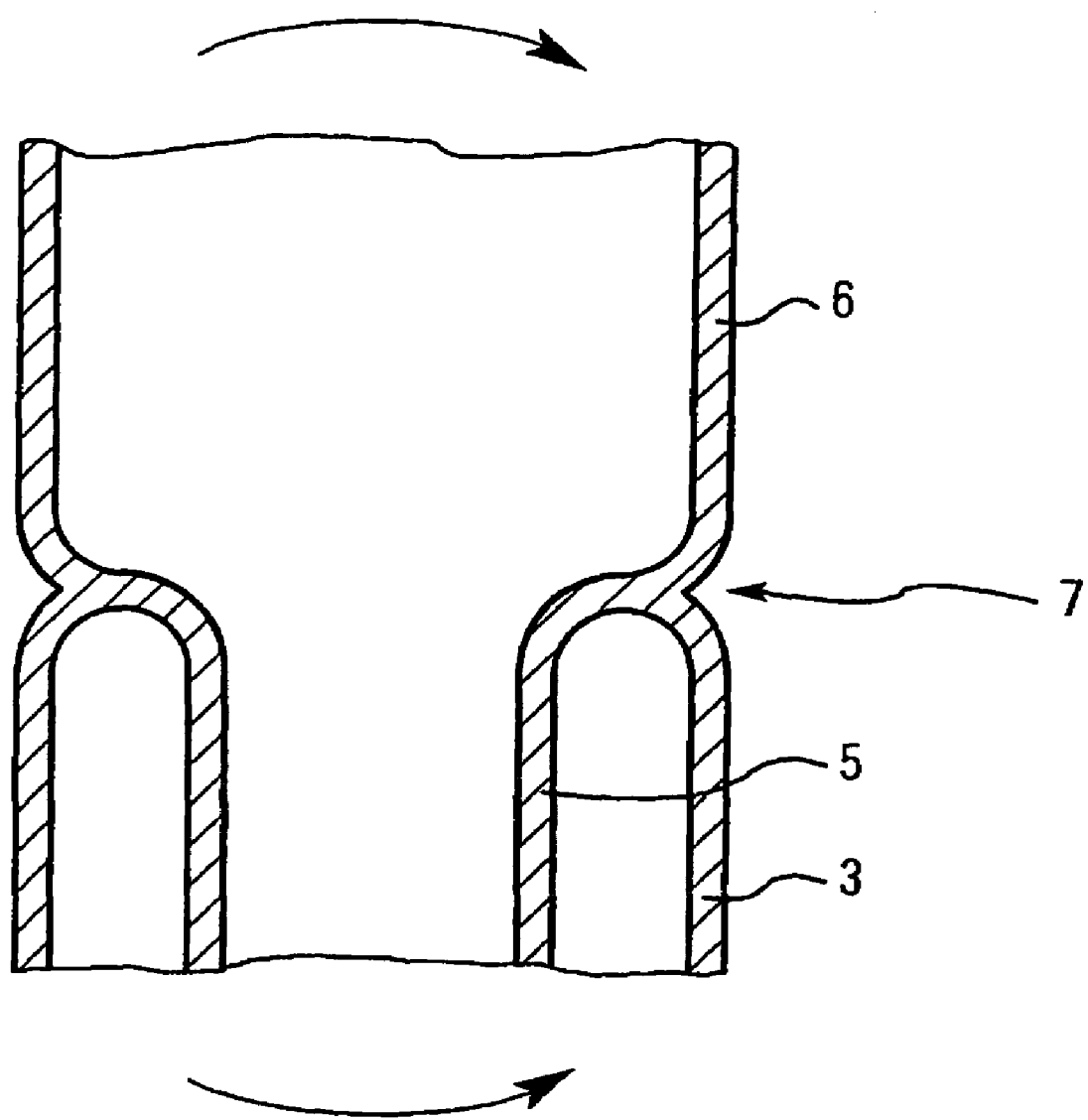
FIG. 5 shows the detail V according to FIG. 2.
Figure 9:
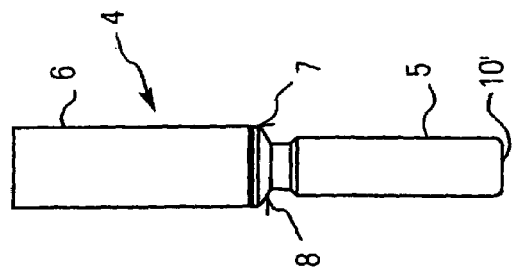
FIG. 9 shows the closing plug used according to FIG. 6-8.
Figure 8:
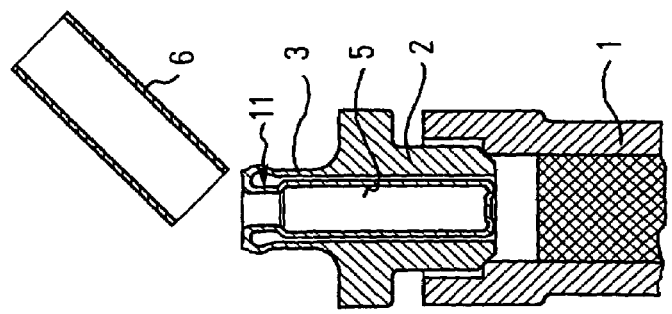
FIG. 6-8 show the method steps carried out for closing a hollow body according to one variant of the present invention.
Figure 7:
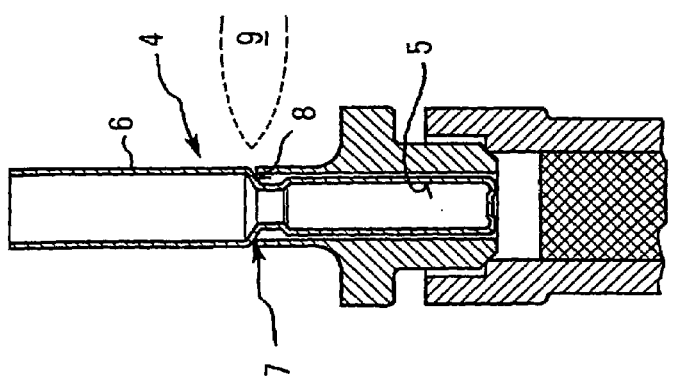
Figure 6:
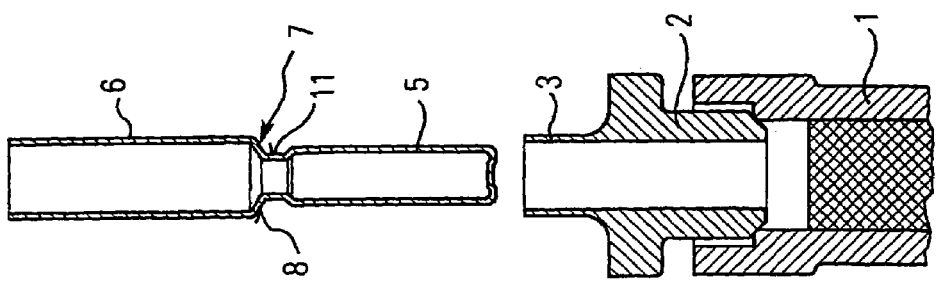
Figure 13:
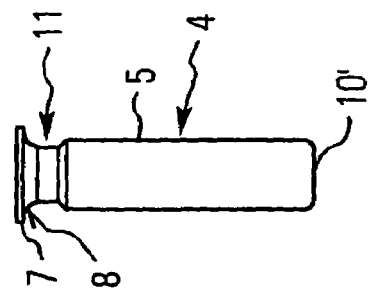
FIG. 13 shows the closing plug used according to FIG. 10-12.
Figure 12:
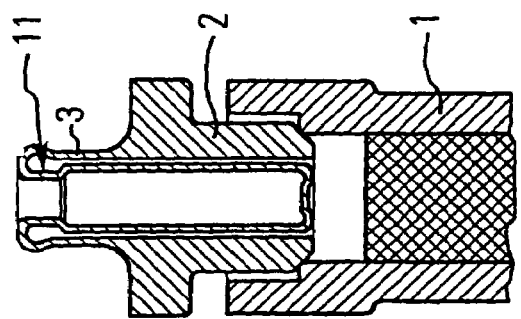
FIG. 10-12 show the individual steps of a method carried out for closing a hollow body according to a second variant.
Figure 11:
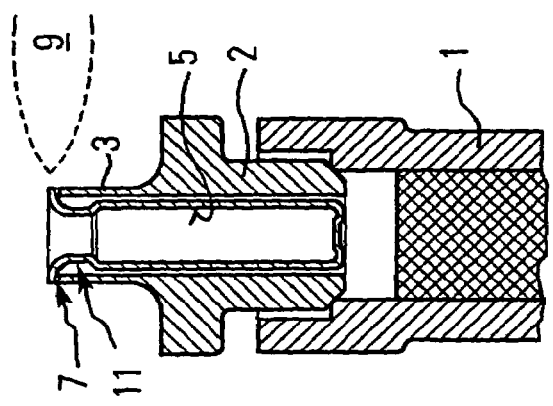
Figure 10:
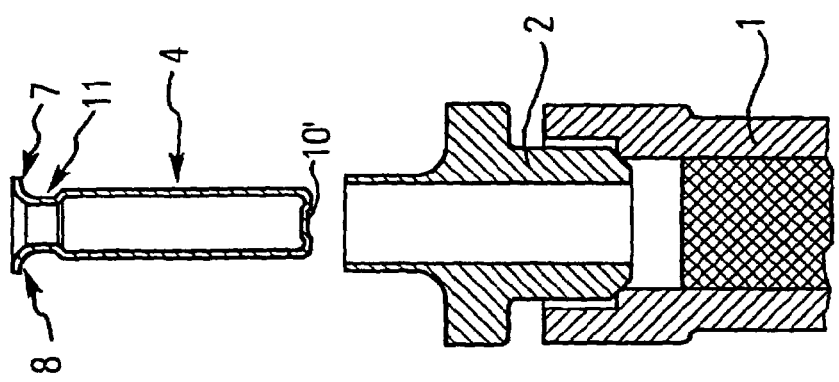

FIG. 1 shows in the lower part thereof the bottle neck 1 of a wine bottle which is made of glass and which is not shown in detail, the upper part of said bottle neck being provided with a closing element 2 made of glass as well. The closing element 2 is provided with a thin-walled, cylindrical filling neck 3. Such an arrangement is described in detail in DE 10209990. This application is referred to for the purpose of disclosure.

Above the filling neck, a stepped glass plug 4 is shown comprising a lower portion 5 and an upper portion 6. The lower portion 5 is cylindrical in shape with a spherical bottom 10 and has an outer diameter that is only slightly smaller than the inner diameter of the filling neck 3. The upper portion 6, however, has an outer diameter which corresponds essentially to the outer diameter of the filling neck 3. The wall thickness of the closing plug corresponds essentially to the wall thickness of the filling neck 3, but it may also be thinner. The preferred thicknesses are a wall thickness of the glass plug 4 of 0.5 mm and a thickness of the filling neck 3 of 1 mm. At the transition point between the portions 5 and 6, a flange 7 is provided, which extends radially outwards, the flange side facing the filling neck being slightly funnel-shaped in the sense of a centering bevel 8. As can be seen from FIG. 4, the outer surface of the glass plug 4, or, to be precise, the outer surface of the portion 5 can have applied thereto a lettering, said lettering containing e.g. information on the bottler and the date of bottling.

The actual closing is done as follows. Starting from the position in FIG. 1, the lower portion 5 of the glass plug 4 is inserted into the filling neck 3 until the flange 7 rests on the upper free end of the filling neck. On the level of said flange 7, the glass is then melted circumferentially by a flame 9, whereby the flange 7 will fuse with the upper end of the filling neck. This can be seen more precisely in the detail view according to FIG. 5, which shows the condition after the fusing. On the basis of FIG. 2, it can be seen clearly that the inwardly projecting portion 5 of the glass plug 4 does not only drive out the air volume in the element 2 but that, during the melting process, it also prevents an ingress of air from the melting location into the interior of the bottle. The melting process only leads to local heating of the glass plug 4 and of the filling neck 3 in the area of the weld, but not in the area where the filling neck ends into the comparatively thick-walled closure element.

As can more easily be seen in FIG. 3, the upper portion 6, which essentially only serves to handle the glass plug during the closing process, is broken off. This can be done without taking special measures, since, as can be seen from FIG. 5, an indentation is formed above the filling neck due to the melting process, said indentation resulting inevitably in defined tearing off.

FIG. 6-9 show a variant of the above-described method and, consequently, only the differences will be discussed in the following. Considering first the closing plug according to FIG. 9, it turns out that this closing plug differs from the above-described embodiment with regard to its bottom 10'.

Another distinguishing feature is that a constriction 11 is provided below the flange 7, the outer diameter of said constriction 11 being smaller than the outer diameter of the rest of the closing plug portion 5 projecting into the filling neck 3. The closing process in the case of the variant shown in FIG. 6-9 is carried out in essentially the same way as the closing process according to the above-described variant. In the melting process shown in FIG. 7, a slight pressure is, however, applied to the glass plug from above; this pressure, together with the melting process, guarantees that the juncture between the filling neck and the glass plug assumes a round shape, as can more easily be seen in FIG. 8.

FIG. 10-13 show a second variant of the above-described method. This variant essentially differs from the variant according to FIG. 6-9 insofar as the glass plug is not provided with a portion projecting beyond the flange 7. Hence, this variant has the advantage that it is not necessary to break off a projecting portion of the glass plug. In addition, the melting process according to FIG. 11 need not necessarily be executed by a laterally applied flame, but it is here also possible to use heat sources which are arranged above the glass plug.

The invention claimed is:

1. A method for closing an already filled hollow glass body provided with a substantially cylindrical filling neck, said filling neck being closed by a melting process once the hollow body has filled, the method comprising:

inserting a glass closing plug in the filling neck to drive out at least part of the air volume located above the filling level of the hollow body, the glass plug including a radially projecting flange provided at a substantially middle portion in a longitudinal direction thereof, whose outer diameter corresponds to the outer diameter of the filling neck and has a circumferentially extending centering bevel on the side facing the filling neck, an area of the glass plug projecting into the filling neck has an outer diameter which corresponds essentially to the inner diameter of the filling neck, and an external portion of the glass plug extends in the longitudinal direction above the flange and has an outer diameter which corresponds essentially to the outer diameter of the filling neck; and fusing the substantially middle portion of the plug with a top end of the filling neck at a circumference thereof.

2. The method according to claim 1, wherein the glass plug is thin-walled and hollow and has a wall thickness smaller than a wall thickness of the filling neck.

3. The method according to claim 1, wherein the glass plug is thin-walled and hollow and has a thickness identical to the wall thickness of said filling neck.

4. The method according to claim 1, wherein the glass plug has a wall thickness corresponding to 50% of the wall thickness of said filling neck.

5. The method according to claim 1, further comprising applying lettering to an outer surface of a portion of the glass plug inserted into the filling neck.

6. The method according to claim 1, wherein immediately below the flange, the glass plug has a constriction whose outer diameter is smaller than the outer diameter of the rest of the portion of the glass plug projecting into the filling neck.

7. The method according to claim 1, further comprising:
removing the external portion after fusing of the glass plug and of the filling neck.

8. The method according to claim 1, further comprising:
inserting the glass closing plug below the filling level of the hollow body.

9. A fillable hollow glass body provided with a substantially cylindrical glass filling neck configured to be closed by a melting process once the hollow body has been filled, the glass body comprising:

a glass closing plug configured to be inserted into the filling neck and to drive out at least part of the air volume located above a filling level of the glass body, wherein the glass plug includes a radially projecting flange provided at a substantially middle portion in a longitudinal direction thereof, whose outer diameter corresponds to the outer diameter of the filling neck, the flange including a circumferentially extending centering bevel on the side facing the filling neck wherein an area of the glass plug projecting into the filling neck has an outer diameter which corresponds essentially to the inner diameter of the filling neck, wherein the glass plug includes an external portion that extends in the longitudinal direction above the flange and has an outer diameter which corresponds essentially to the outer diameter of the filling neck, and wherein the substantially middle portion of the glass plug is configured to be fused with a top end of the filling neck at the circumference thereof.

10. The glass body according to claim 9, wherein the external portion of the glass plug is configured to be removed after fusing the glass plug with the filling neck.

11. A kit including a hollow glass body provided with a substantially cylindrical glass filling neck configured to be closed by a melting process once the hollow body has filled, the glass body comprising:

a glass closing plug configured to be inserted into the filling neck and to drive out at least part of the air volume located above the filling level of the glass body, wherein the glass plug includes a radially projecting flange provided at a substantially middle portion in a longitudinal direction thereof, whose outer diameter corresponds to the outer diameter of the filling neck, the flange including a circumferentially extending centering bevel on the side facing the filling neck, wherein an area of the glass plug projecting into the filling neck has an outer diameter which corresponds essentially to the inner diameter of the filling neck, wherein the glass plug includes an external portion that extends in the longitudinal direction above the flange and has an outer diameter which corresponds essentially to the outer diameter of the filling neck, and wherein the substantially middle portion of the glass plug is configured to be fused with a top end of the filling neck at the circumference thereof.

12. The kit according to claim 11, wherein the external portion of the glass plug is configured to be removed after fusing the glass plug with the filling neck.

\* \* \* \* \*